US011594363B2

(12) United States Patent
Moriki et al.

(10) Patent No.: US 11,594,363 B2
(45) Date of Patent: Feb. 28, 2023

(54) COIL COMPONENT AND WIRELESS POWER TRANSMISSION DEVICE PROVIDED WITH THE SAME

(71) Applicant: TDK CORPORATION, Tokyo (JP)

(72) Inventors: Tomohiro Moriki, Tokyo (JP); Takahiro Ohishi, Tokyo (JP); Hirohumi Asou, Tokyo (JP); Noritaka Chiyo, Tokyo (JP); Toshio Tomonari, Tokyo (JP); Junpei Hamaya, Tokyo (JP); Shigeki Ohtsuka, Tokyo (JP); Takaaki Imai, Tokyo (JP); Takakazu Maruyama, Tokyo (JP); Osamu Taguchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 275 days.

(21) Appl. No.: 16/859,130

(22) Filed: Apr. 27, 2020

(65) Prior Publication Data
US 2020/0381167 A1    Dec. 3, 2020

(30) Foreign Application Priority Data
May 30, 2019  (JP) .............................. JP2019-100902

(51) Int. Cl.
*H01F 27/28* (2006.01)
*H01F 27/245* (2006.01)
(Continued)

(52) U.S. Cl.
CPC ......... *H01F 27/2804* (2013.01); *H01F 5/003* (2013.01); *H01F 17/0013* (2013.01); *H01F 27/245* (2013.01); *H01F 27/29* (2013.01); *H01F 27/292* (2013.01); *H01F 27/36* (2013.01); *H01F 38/14* (2013.01); *H02J 7/0042* (2013.01);
(Continued)

(58) Field of Classification Search
CPC ........ H01F 27/2804; H01F 2027/2809; H01F 2027/2814; H01F 5/003; H01F 17/0006; H01F 17/0013; H01F 2017/006; H01F 2017/0086; H01F 38/14; H01F 41/041; H05K 1/165; H05K 2201/1003; H02J 50/10; H02J 7/025; H02J 50/12
See application file for complete search history.

(56) References Cited

U.S. PATENT DOCUMENTS 5,929,734 A * 7/1999 Weiner ...................... H01F 5/02
                                                    336/200
7,460,002 B2 * 12/2008 Estrov ................ H01F 27/2847
                                                    336/200
(Continued)

FOREIGN PATENT DOCUMENTS

JP           2018102124 A      6/2018

*Primary Examiner* — Ryan Johnson
(74) *Attorney, Agent, or Firm* — Young Law Firm, P.C.

(57) ABSTRACT

Disclosed herein is a coil component that includes first and second substrates, a first coil pattern formed on one surface of the first substrate, a second coil pattern formed on one surface of the second substrate, a first terminal electrode connected to one end of the first coil pattern and protruding from the first substrate, and a second terminal electrode connected to one end of the second coil pattern and protruding from the second substrate. The first and second substrates are laminated such that the first and second terminal electrodes overlap each other and are connected to each other.

9 Claims, 17 Drawing Sheets

(51) Int. Cl.
- *H01F 38/14* (2006.01)
- *H01F 5/00* (2006.01)
- *H02J 7/00* (2006.01)
- *H01F 17/00* (2006.01)
- *H01F 27/29* (2006.01)
- *H02J 50/10* (2016.01)
- *H01F 27/36* (2006.01)

(52) U.S. Cl.
CPC ...... *H02J 50/10* (2016.02); *H01F 2027/2809* (2013.01); *H01F 2027/297* (2013.01)

(56) References Cited

U.S. PATENT DOCUMENTS

| | | | |
|---|---|---|---|
| 8,441,331 B2* | 5/2013 | Maple | H01F 27/2847 336/198 |
| 2017/0229900 A1* | 8/2017 | Cho | H02J 50/005 |

* cited by examiner

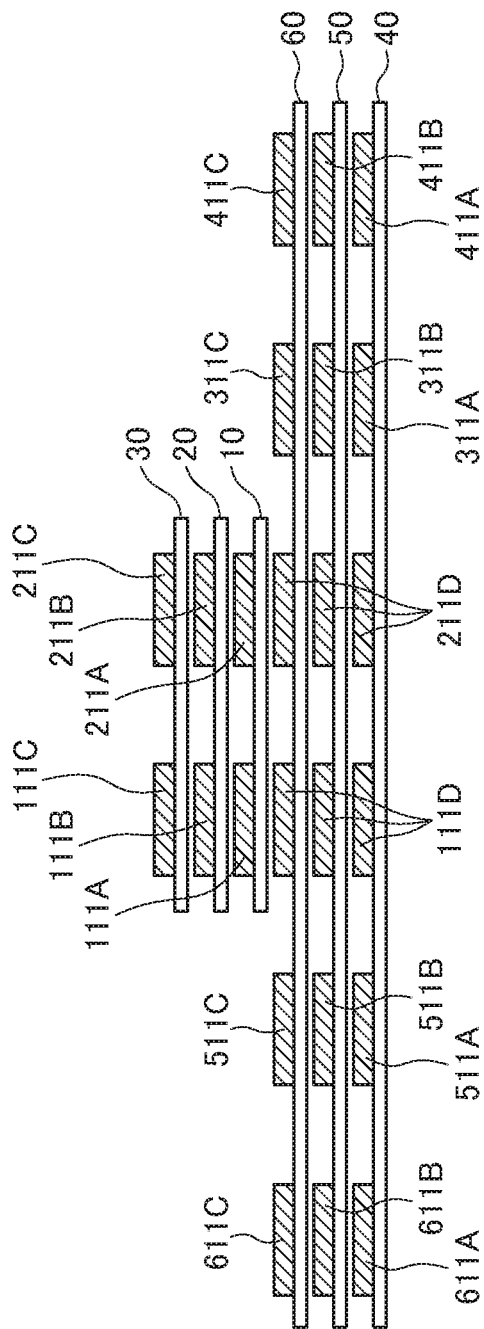
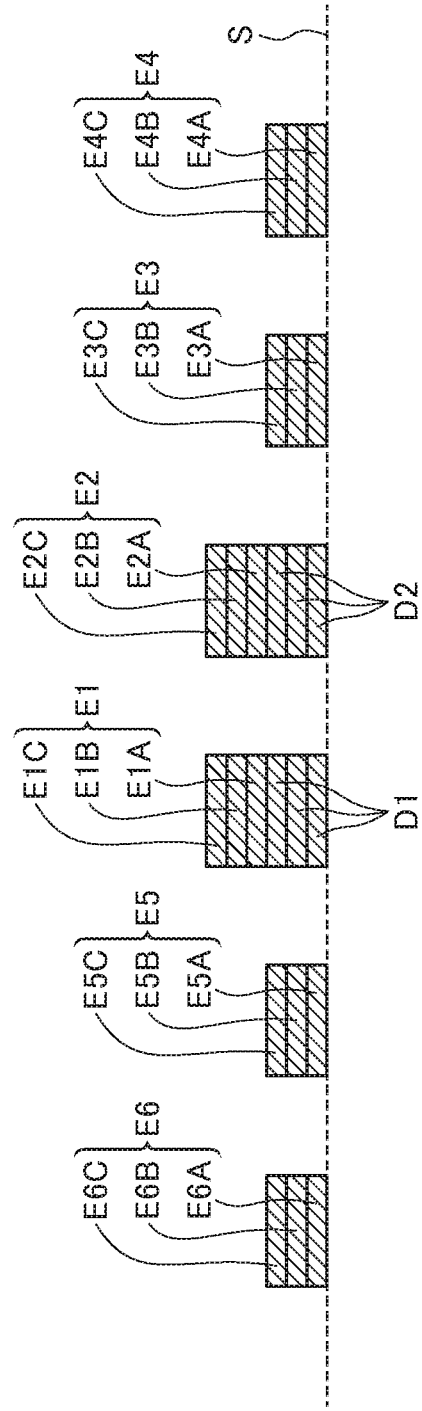

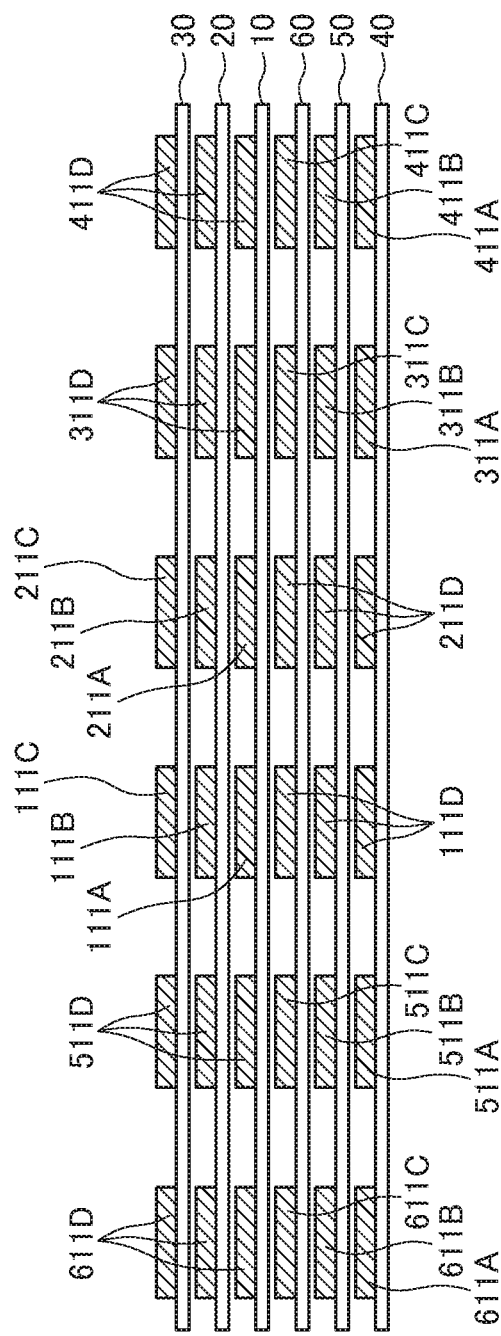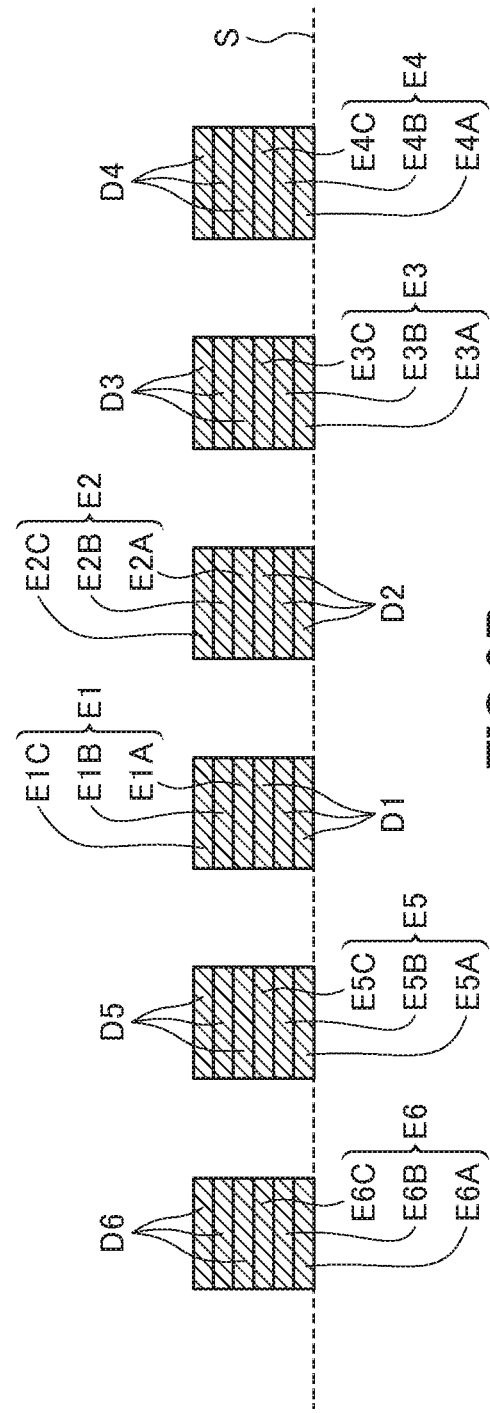

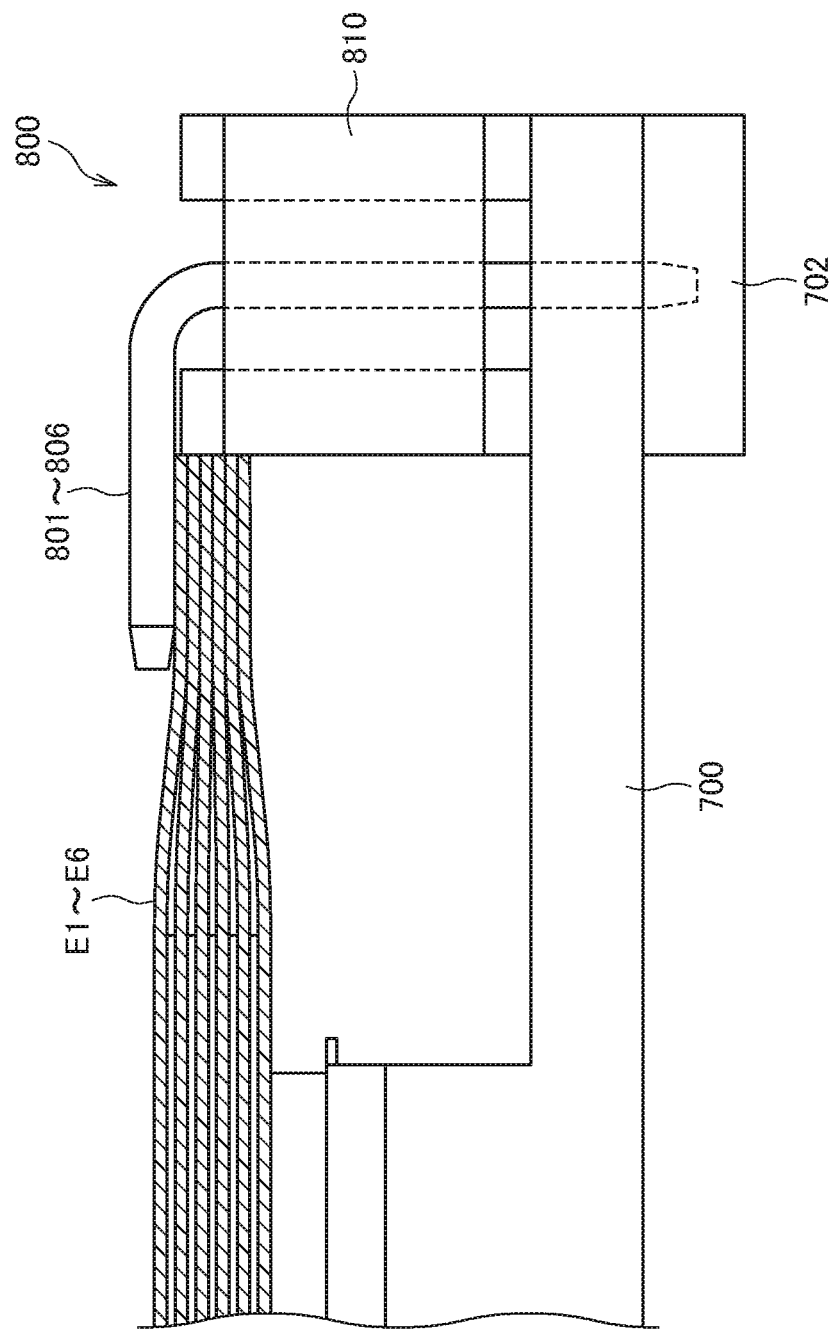

COIL COMPONENT AND WIRELESS POWER TRANSMISSION DEVICE PROVIDED WITH THE SAME

BACKGROUND OF THE INVENTION

Field of the Invention

The present invention relates to a coil component and, more particularly, to a coil component suitably used for a wireless power transmission device and a wireless power transmission device provided with the coil component.

Description of Related Art

In recent years, wireless power transmission devices that feed electric power from a power transmitting side to a power receiving side by wireless are put in practical use. The wireless power transmission devices are expected to be applied to various products including transport equipment such as electric trains or electric cars, household appliances, electronic devices, wireless communication devices, toys, and industrial equipment. For example, JP 2018-102124A discloses an example in which a plurality of substrates each having a spiral-shaped coil pattern are laminated so as to be mutually connected to constitute a power transmitting coil or a power receiving coil for a wireless power transmission device.

The coil component described in JP 2018-102124A has a configuration in which the plurality of coil patterns are connected in parallel. This reduces a resistance value to allow more current to flow.

However, in the coil component described in JP 2018-102124A, the coil patterns formed in different substrates are mutually connected at positions overlapping the substrate, so that connection of the coil patterns is not necessarily easy.

SUMMARY

It is therefore an object of the present invention to provide a coil component having a configuration in which coil patterns formed in different substrates can be easily mutually connected and a wireless power transmission device provided with such a coil component.

A coil component according to the present invention includes: first and second substrates; a first coil pattern formed on one surface of the first substrate; a second coil pattern formed on one surface of the second substrate; a first terminal electrode connected to one end of the first coil pattern and protruding from the first substrate; and a second terminal electrode connected to one end of the second coil pattern and protruding from the second substrate. The first and second substrates are laminated such that the first and second terminal electrodes overlap each other and are connected to each other.

According to the present invention, the terminal electrode protrudes from the substrate, so that it is possible to easily connect a plurality of terminal electrodes. In addition, the terminal electrode protruding from the substrate can be used as an external terminal of the coil component.

The coil component according to the present invention may further include: a third coil pattern formed on the other surface of the first substrate; a fourth coil pattern formed on the other surface of the second substrate; a third terminal electrode connected to one end of the third coil pattern and protruding from the first substrate; and a fourth terminal electrode connected to one end of the fourth coil pattern and protruding from the second substrate. The other end of the first coil pattern and the other end of the third coil pattern may be connected to each other. The other end of the second coil pattern and the other end of the fourth coil pattern may be connected to each other. The first and second substrates may be laminated such that the third and fourth terminal electrodes overlap each other and are connected to each other. With the above configuration, a first coil composed of the first and third coil patterns and a second coil composed of the second and fourth coil patterns can be easily connected in parallel.

The coil component according to the present invention may further include third and fourth substrates; a fifth coil pattern formed on one surface of the third substrate; a sixth coil pattern formed on one surface of the fourth substrate; a seventh coil pattern formed on the other surface of the third substrate; an eighth coil pattern formed on the other surface of the fourth substrate; a fifth terminal electrode connected to one end of the fifth coil pattern and protruding from the third substrate; a sixth terminal electrode connected to one end of the sixth coil pattern and protruding from the fourth substrate; a seventh terminal electrode connected to one end of the seventh coil pattern and protruding from the third substrate; and an eighth terminal electrode connected to one end of the eighth coil pattern and protruding from the fourth substrate. The other end of the fifth coil pattern and the other end of the seventh coil pattern maybe connected to each other. The other end of the sixth coil pattern and the other end of the eighth coil pattern maybe connected to each other. The third and fourth substrates are laminated such that the fifth and sixth terminal electrodes overlap each other and are connected to each other and that the seventh and eighth terminal electrodes overlap each other and are connected to each other. The first, second, third, and fourth substrates may be laminated such that the first to fourth coil patterns and the fifth to eighth coil patterns partly overlap. With the above configuration, a coil unit composed of the first to fourth coil patterns and a coil unit composed of the fifth to eighth coil patterns are different in planar position, so that when these coil units are used as a power transmitting coil or a power receiving coil for a wireless power transmission device, a power transmittable area or a power receivable area can be enlarged.

The coil component according to the present invention may further include first and second dummy electrodes protruding from the third substrate. The first dummy electrode may overlap the first and second terminal electrodes, and the second dummy electrode may overlap the third and fourth terminal electrodes. With this configuration, it is possible to facilitate connection between the first and second terminal electrodes and to facilitate connection between the third and fourth terminal electrodes.

The coil component according to the present invention may further include third and fourth dummy electrodes protruding from the fourth substrate. The third dummy electrode may overlap the first and second terminal electrodes and the first dummy electrode, and the fourth dummy electrode may overlap the third and fourth terminal electrodes and the second dummy electrode. With this configuration, it is possible to further facilitate connection between the first and second terminal electrodes and to further facilitate connection between the third and fourth terminal electrodes.

The coil component according to the present invention may further include fifth and seventh dummy electrodes protruding from the first substrate and sixth and eighth dummy electrodes protruding from the second substrate.

The fifth and sixth dummy electrodes may overlap the fifth and sixth terminal electrodes, and the seventh and eighth dummy electrodes may overlap the seventh and eighth terminal electrodes. With this configuration, it is possible to facilitate connection between the fifth and sixth terminal electrodes and to facilitate connection between the seventh and eighth terminal electrodes.

The coil component according to the present invention may further include: a first connector pin connected to the first and second terminal electrodes; a second connector pin connected to the third and fourth terminal electrodes; a third connector pin connected to the fifth and sixth terminal electrodes; and a fourth connector pin connected to the seventh and eighth terminal electrodes. With this configuration, it is possible to facilitate connection between the coil component and a circuit board.

A wireless power transmission device according to the present invention includes: the above-described coil component and a circuit board connected to first to fourth coil patterns through first and second connector pins and to fifth to eighth coil patterns through third and fourth connector pins. According to the present invention, it is possible to facilitate connection between the circuit board and the coil component, allowing a reduction in manufacturing cost.

In the present invention, the circuit board may have a switch that exclusively make current to flow in the first to fourth coil patterns and fifth to eighth coil patterns. With this configuration, when the coil component according to the present invention is used as a power transmitting coil of a wireless power transmission device, the first to fourth coil patterns and the fifth to eighth coil patterns can be selectively used according to the planar position of a power receiving coil for power transmission.

As described above, according to the present invention, there can be provided a coil component having a configuration in which coil patterns formed in different substrates can be easily mutually connected and a wireless power transmission device provided with such a coil component.

BRIEF DESCRIPTION OF THE DRAWINGS

The above features and advantages of the present invention will be more apparent from the following description of certain preferred embodiments taken in conjunction with the accompanying drawings, in which:

FIG. 8A is a schematic cross-sectional view of a portion where the lead-out pattern is formed according to a first modification;

FIG. 8B is a schematic cross-sectional view of a portion where the terminal electrode is formed according to the first modification;

FIG. 9A is a schematic cross-sectional view of a portion where the lead-out pattern is formed according to a second modification;

FIG. 9B is a schematic cross-sectional view of a portion where the terminal electrode is formed according to the second modification;

FIGS. 15 to 17 are schematic views for explaining a second method of connecting the coil component and the circuit board.

DETAILED DESCRIPTION OF THE EMBODIMENTS

Preferred embodiments of the present invention will be explained below in detail with reference to the accompanying drawings.

Figure 1:
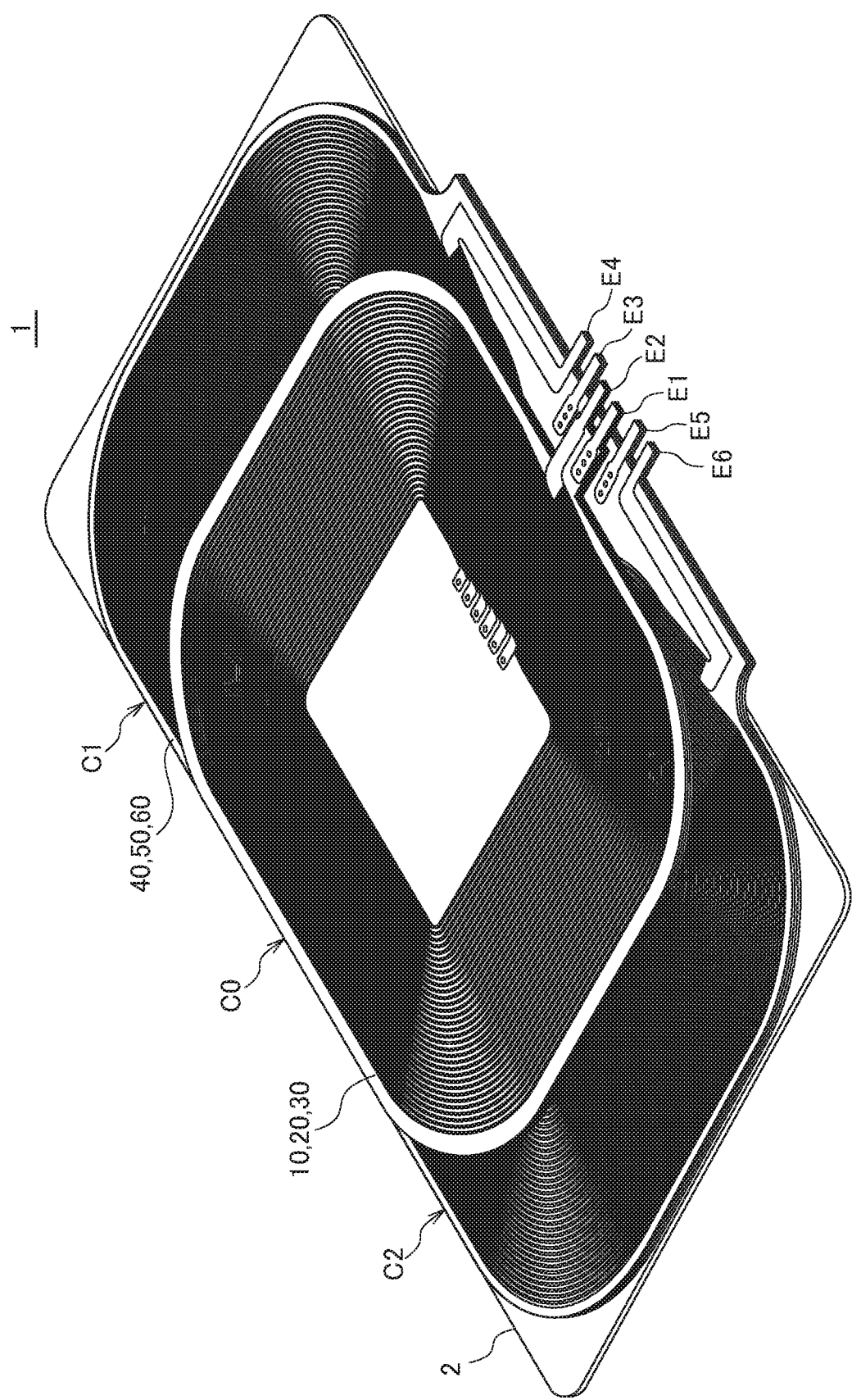
FIG. 1 is a schematic perspective view indicating an outer appearance of a coil component according to a preferred embodiment of the present invention.
Figure 2:
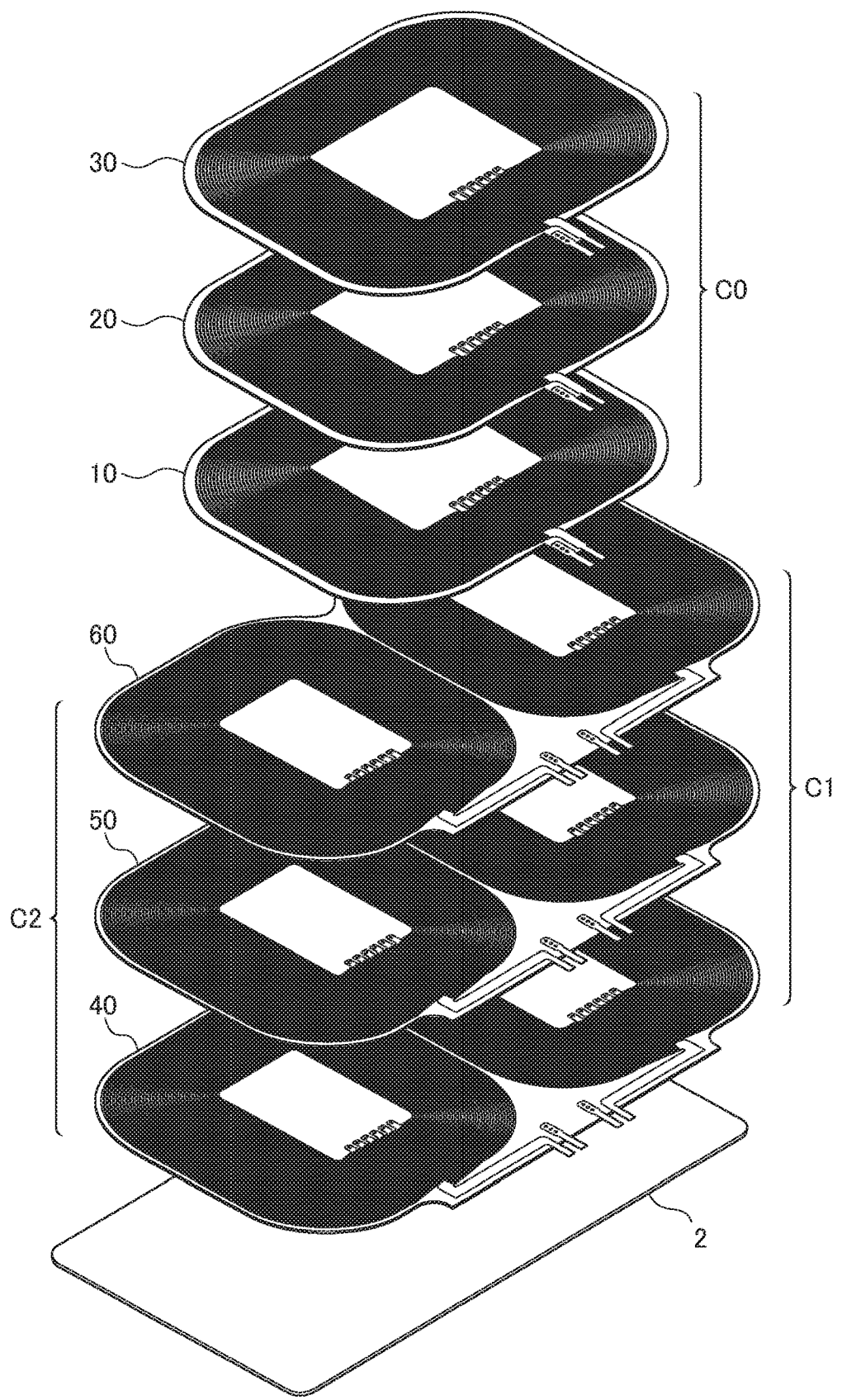
FIG. 2 is a schematic exploded perspective view of the coil component shown in FIG. 1.
Figure 3:
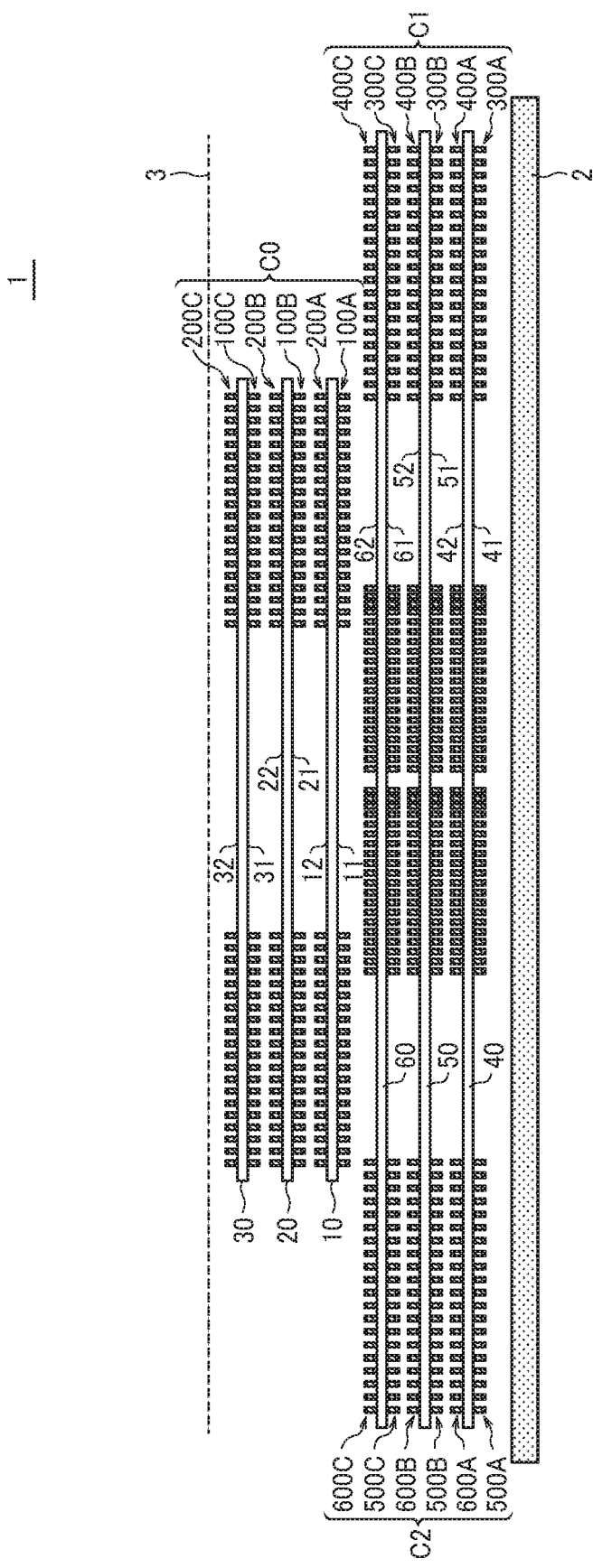
FIG. 3 is a schematic cross-sectional view of the coil component shown in FIG. 1.

FIG. 1 is a schematic perspective view indicating an outer appearance of a coil component 1 according to a preferred embodiment of the present invention. FIG. 2 is a schematic exploded perspective view of the coil component 1. FIG. 3 is a schematic cross-sectional view of the coil component 1.

As illustrated in FIGS. 1 to 3, the coil component 1 according to the present embodiment includes a magnetic sheet 2, a center coil C0, a first side coil C1, and a second side coil C2 each of which is disposed so as to overlap the magnetic sheet 2. The magnetic sheet 2 is a sheet member made of as high permeability material such as ferrite, permalloy, or a composite magnetic material and functions as a magnetic path for magnetic flux that interlinks with the center coil C0 and side coils C1, C2. Although not particularly limited, the coil component 1 according to the present embodiment can be used as a power transmitting coil of a wireless power transmission system. In this case, a power receiving coil is disposed on a power receiving surface 3 positioned on the side opposite to the magnetic sheet 2 with respect to the center coil C0 and side coils C1, C2.

The center coil C0 has coil patterns 100A, 100B, and 100C formed respectively on one surfaces 11, 21, and 31 of substrates 10, 20, and 30 and coil patterns 200A, 200B, and 200C formed respectively on the other surfaces 12, 22, and 32 of substrates 10, 20, and 30. The first side coil C1 has coil patterns 300A, 300B, and 300C formed respectively on one surfaces 41, 51, and 61 of substrates 40, 50, and 60, and coil patterns 400A, 400B, and 400C formed respectively on the other surfaces 42, 52, and 62 of substrates 40, 50, and 60. The second side coil C2 has coil patterns 500A, 500B, and 500C formed respectively on one surfaces 41, 51, and 61 of substrates 40, 50, and 60, and coil patterns 600A, 600B, and 600C formed respectively on the other surfaces 42, 52, and 62 of substrates 40, 50, and 60. Although there is no particular restriction on the material of the substrates 10, 20, 30, 40, 50, and 60, a film-shaped transparent or semi-transparent flexible material, such as PET resin, having a thickness of about 10 μm to 50 μm can be used. Further, the substrates 10, 20, 30, 40, 50, and 60 may each be a flexible substrate obtained by impregnating glass cloth with epoxy-based resin.

In the present embodiment, the coil patterns (100A, 100B, 100C, 200A, 200B, and 200C) constituting the center coil C0 are the same in the number of turns, the coil patterns (300A, 300B, 300C, 400A, 400B, and 400C) constituting the first side coil C1 are the same in the number of turns, and the coil patterns (500A, 500B, 500C, 600A, 600B, and 600C) constituting the second side coil C2 are the same in the number of turns. Further, the coil patterns constituting the first side coil C1 and the coil patterns constituting the second side coil C2 are also the same in the number of turns. The coil patterns constituting the center coil C0 and the coil patterns constituting the first side coil C1 or second side coil C2 may be the same or different in the number of turns. Hereinafter, when there is no particular need to make a distinction between the coil patterns 100A, 100B, and 100C, or when the coil patterns 100A, 100B, and 100C are collectively referred to, they are sometimes simply referred to as "coil pattern 100". The same applies to the other coil patterns 200, 300, 400, 500, and 600.

Figure 4:
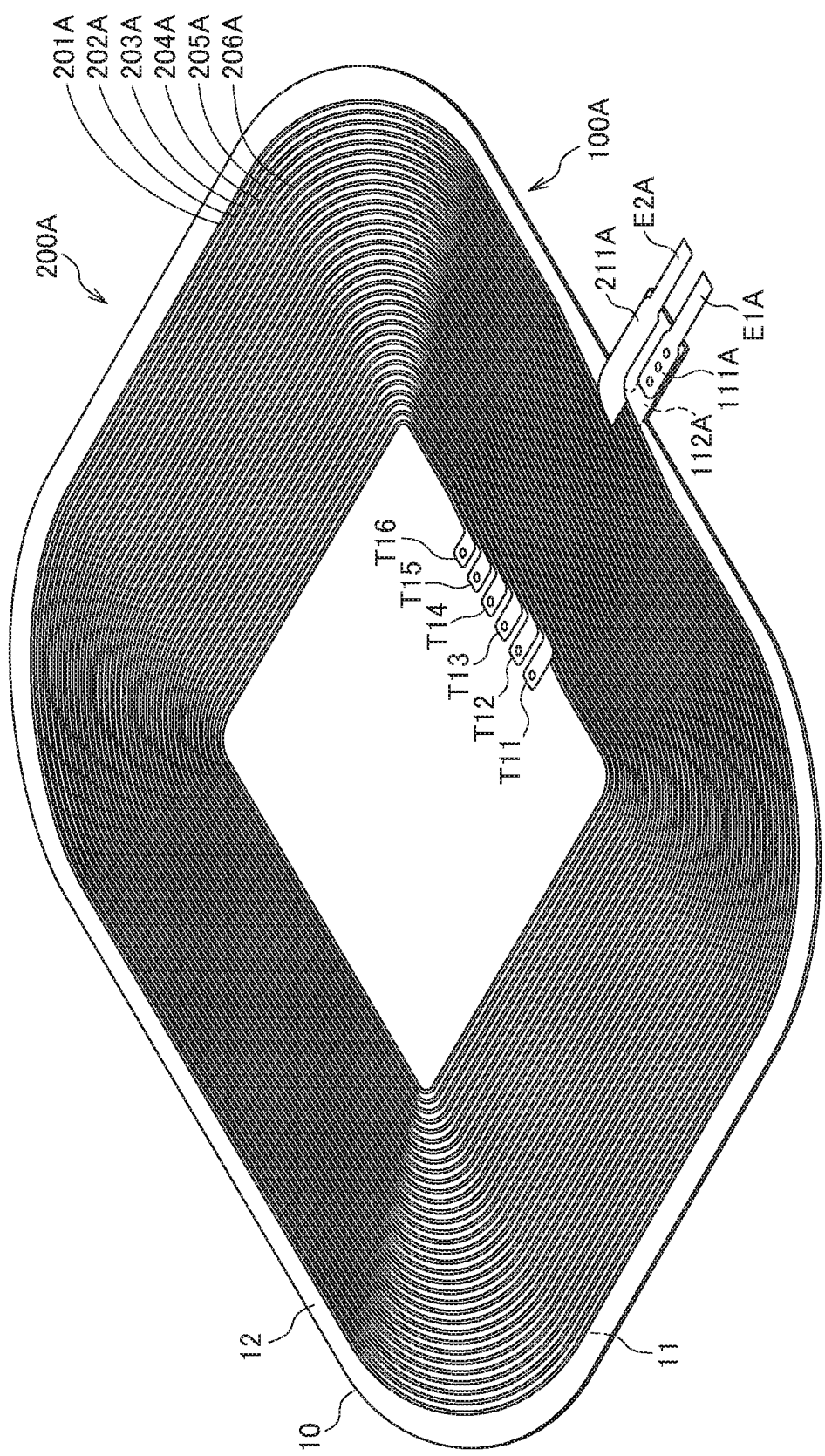
FIG. 4 is a schematic perspective view for explaining the shape of a substrate and the shapes of the coil patterns formed on the substrate.

FIG. 4 is a schematic perspective view for explaining the shape of the substrate 10 and the shapes of the coil patterns 100A and 200A formed on the substrate 10.

As illustrated in FIG. 4, the outer peripheral end of the coil pattern 100A is connected to a terminal electrode E1A, and the outer peripheral end of the coil pattern 200A is connected to a terminal electrode E2A. The terminal electrodes E1A and E2A are not formed on the substrate 10, but protrude therefrom. That is, the terminal electrodes E1A and E2A do not overlap the substrate 10. The terminal electrode E1A is connected to the outer peripheral end of the coil pattern 100A through a lead-out pattern 111A provided on the one surface 11 of the substrate 10 and a lead-out pattern 112A provided on the other surface 12 of the substrate 10. The lead-out patterns 111A and 112A are connected to each other through a through hole conductor penetrating the substrate 10. On the other hand, the terminal electrode E2A is connected to the outer peripheral end of the coil pattern 200A through a lead-out pattern 211A provided on the one surface 11 of the substrate 10.

The terminal electrodes E1A and E2A are extensions of the lead-out patterns 111A and 211A, respectively, and are made of the same conductive material as those of the lead-out patterns 111A and 211A. The terminal electrodes E1A and E2A are once formed on the surface of the substrate 10 simultaneously with the coil patterns 100A, 200A and lead-out patterns 11A, 112A, 211A and, thereafter, a part of the substrate 10 that overlaps the terminal electrodes E1A and E2A is removed by laser beam irradiation or the like, with the result that the terminal electrodes E1A and E2A protrude from the substrate 10.

Although not particularly limited, the coil patterns 100A and 200A are each radially divided into six parts by five spiral slits. For example, the coil pattern 200A is divided into six lines 201A to 206A, and the lines 201A to 206A are each spirally wound in a plurality of turns. The inner peripheral ends of the respective lines 201A to 206A are connected respectively to their corresponding lines of the coil pattern 100A through through hole conductors T11 to T16 penetrating the substrate 10. Specifically, the outermost line 201A is connected to the innermost line of the coil pattern 100A through the through hole conductor T11, and the innermost line 206A is connected to the outermost line of the coil pattern 100A through the through hole conductor T16.

The coil patterns 100B, 200B, 100C, and 200C have the same configuration, so overlapping description will be omitted.

Figure 5:
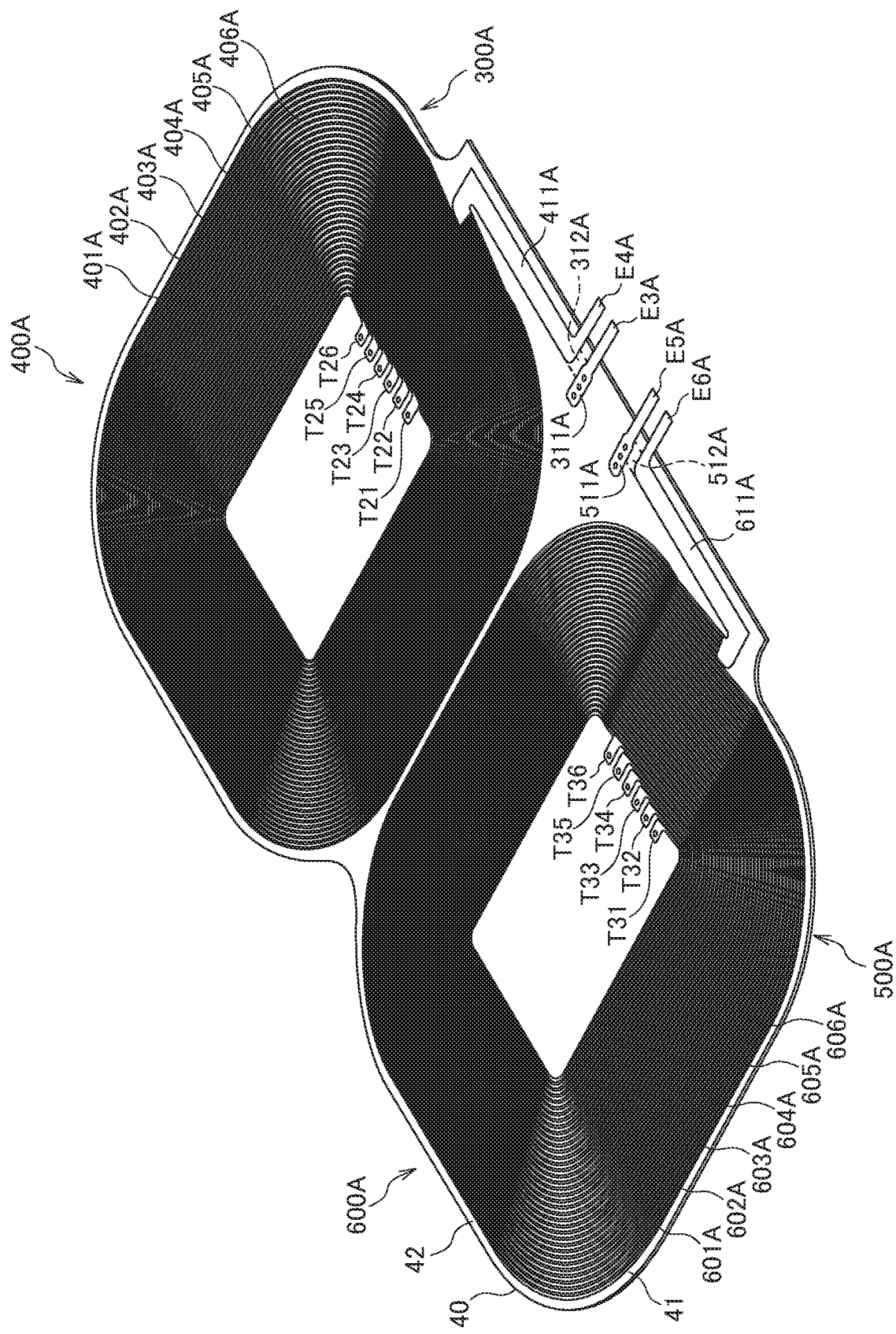
FIG. 5 is a schematic perspective view for explaining the shape of another substrate and the shapes of the coil patterns formed on the substrate.

FIG. 5 is a schematic perspective view for explaining the shape of the substrate 40 and the shapes of the coil patterns 300A, 400A, 500A, and 600A formed on the substrate 40.

As illustrated in FIG. 5, the outer peripheral end of the coil pattern 300A is connected to a terminal electrode E3A, and the outer peripheral end of the coil pattern 400A is connected to a terminal electrode E4A. The terminal electrodes E3A and E4A are not formed on the substrate 40, but protrude therefrom. That is, the terminal electrodes E3A and E4A do not overlap the substrate 40. The terminal electrode E3A is connected to the outer peripheral end of the coil pattern 300A through a lead-out pattern 311A provided on the one surface 41 of the substrate 40 and a lead-out pattern 312A provided on the other surface 42 of the substrate 40. The lead-out patterns 311A and 312A are connected to each other through a through hole conductor penetrating the substrate 40. On the other hand, the terminal electrode E4A is connected to the outer peripheral end of the coil pattern 400A through a lead-out pattern 411A provided on the one surface 41 of the substrate 40.

Similarly, the outer peripheral end of the coil pattern 500A is connected to a terminal electrode E5A, and the outer peripheral end of the coil pattern 600A is connected to a terminal electrode E6A. The terminal electrodes E5A and E6A are not formed on the substrate 40, but protrude therefrom. That is, the terminal electrodes E5A and E6A do not overlap the substrate 40. The terminal electrode E5A is connected to the outer peripheral end of the coil pattern 500A through a lead-out pattern 511A provided on the one surface 41 of the substrate 40 and a lead-out pattern 512A provided on the other surface 42 of the substrate 40. The lead-out patterns 511A and 512A are connected to each other through a through hole conductor penetrating the substrate 40. On the other hand, the terminal electrode E6A is connected to the outer peripheral end of the coil pattern 600A through a lead-out pattern 611A provided on the one surface 41 of the substrate 40.

The terminal electrodes E3A, E4A, E5A, and E6A are extensions of the lead-out patterns 311A, 411A, 511A, and 611A, respectively, and are made of the same conductive material as those of the lead-out patterns 311A, 411A, 511A, and 611A. The terminal electrodes E3A, E4A, E5A, and E6A are once formed on the surface of the substrate 10 simultaneously with the coil patterns 300A, 400A, 500A, 600A and the lead-out patterns 311A, 312A, 411A, 511A, 512A, 611A and, thereafter, a part of the substrate 40 that overlaps the terminal electrodes E3A, E4A, E5A, and E6A is removed by laser beam irradiation or the like, with the result that the terminal electrodes E3A, E4A, E5A, and E6A protrude from the substrate 40.

Although not particularly limited, the coil patterns 300A, 400A, 500A, and 600A are each radially divided into six parts by five spiral slits. For example, the coil pattern 400A is divided into six lines 401A to 406A, and the lines 401A to 406A are each spirally wound in a plurality of turns. Similarly, the coil pattern 600A is divided into six lines 601A to 606A, and the lines 601A to 606A are each spirally wound in a plurality of turns. The inner peripheral ends of the respective lines 401A to 406A are connected respectively to their corresponding lines of the coil pattern 300A through through hole conductors T21 to T26 penetrating the substrate 40. Similarly, the inner peripheral ends of the respective lines 601A to 606A are connected respectively to their corresponding lines of the coil pattern 600A through through hole conductors T31 to T36 penetrating the substrate 40.

Specifically, the outermost line 401A is connected to the innermost line of the coil pattern 300A through the through hole conductor T21, and the innermost line 406A is connected to the outermost line of the coil pattern 300A through the through hole conductor T26. Similarly, the outermost line 601A is connected to the innermost line of the coil pattern 500A through the through hole conductor T31, and the innermost line 606A is connected to the outermost line of the coil pattern 500A through the through hole conductor T36.

The coil patterns 300B, 400B, 500B, 600B, 300C, 400C, 500C, and 600C have the same configuration, so overlapping description will be omitted.

In the present invention, it is not essential to divide each of the turns constituting the coil pattern into a plurality of lines; however, by dividing each turn into a plurality of lines, uneven distribution of current density is reduced. In addition, by reversing the inner and outer peripheral sides between the coil pattern formed on one surface of the substrate and the coil pattern formed on the other surface of the substrate, an inner-outer peripheral difference in line length is eliminated. This makes current density distribution more even, allowing a further reduction in DC resistance or AC resistance.

Figures 6A, 6B:
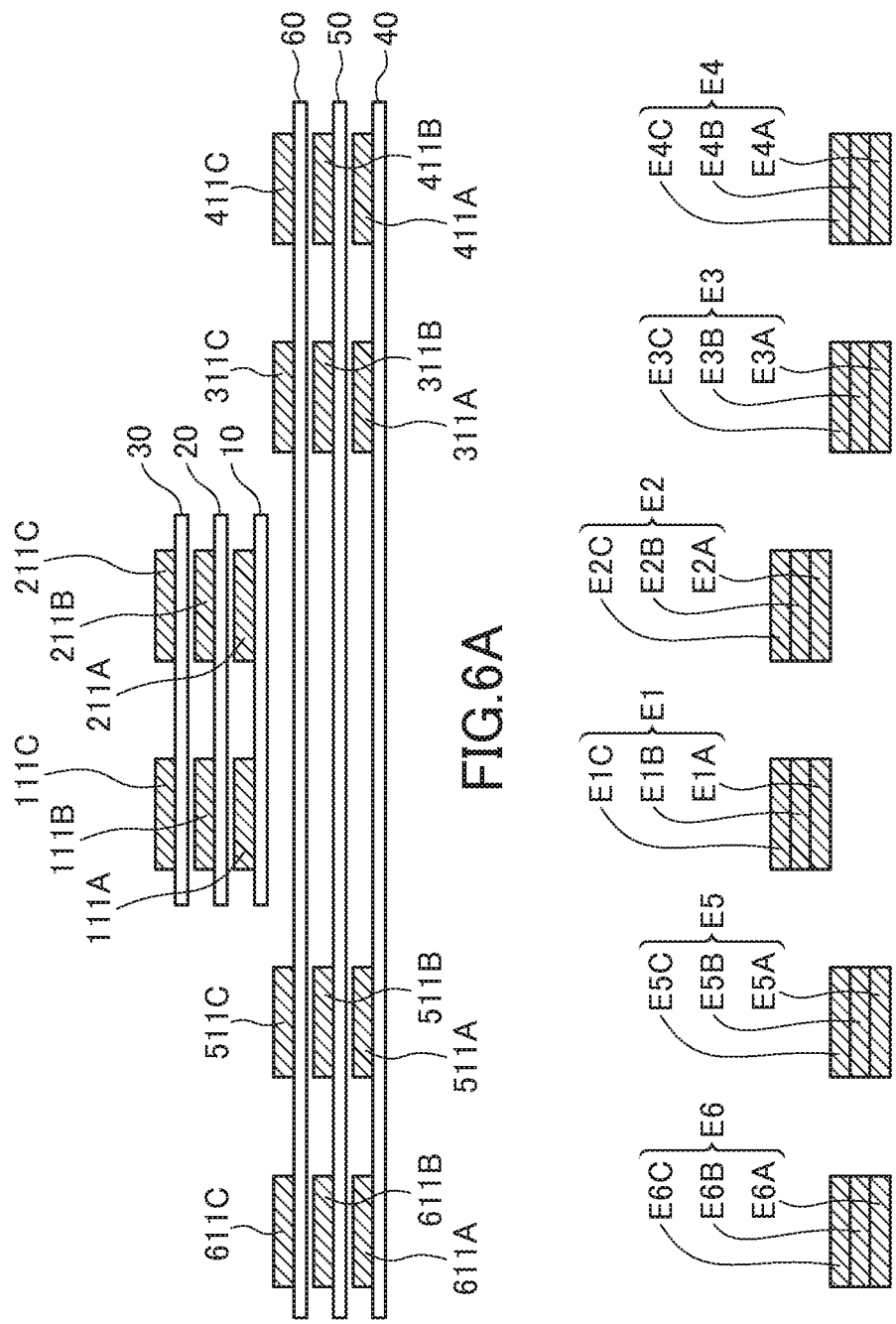
FIG. 6A is a schematic cross-sectional view of a portion where the lead-out pattern is formed.
FIG. 6B is a schematic cross-sectional view of a portion where the terminal electrode is formed.

FIG. 6A is a schematic cross-sectional view of a portion where the lead-out pattern is formed, and FIG. 6B is a schematic cross-sectional view of a portion where the terminal electrode is formed.

As illustrated in FIG. 6A, the three lead-out patterns 111A, 111B, and 111C connected respectively to the outer peripheral ends of the coil patterns 100A, 100B, and 100C overlap one another through the substrates 20 and 30, and the three lead-out patterns 211A, 211B, and 211C connected respectively to the coil patterns 200A, 200B, and 200C overlap one another through the substrates 20 and 30. Further, the three lead-out patterns 311A, 311B, and 311C connected respectively to the outer peripheral ends of the coil patterns 300A, 300B, and 300C overlap one another through the substrates 50 and 60, and the three lead-out patterns 411A, 411B, and 411C connected respectively to the coil patterns 400A, 400B, and 400C overlap one another through the substrates 50 and 60. Similarly, the three lead-out patterns 511A, 511B, and 511C connected respectively to the outer peripheral ends of the coil patterns 500A, 500B, and 500C overlap one another through the substrates 50 and 60, and the three lead-out patterns 611A, 611B, and 611C connected respectively to the coil patterns 600A, 600B, and 600C overlap one another through the substrates 50 and 60.

Hereinafter, the lead-out patterns 111A, 111B, and 111C are collectively referred to merely as "lead-out pattern 111", the lead-out patterns 211A, 211B, and 211C are collectively referred to merely as "lead-out pattern 211", the lead-out patterns 311A, 311B, and 311C are collectively referred to merely as "lead-out pattern 311", the lead-out patterns 411A, 411B, and 411C are collectively referred to merely as "lead-out pattern 411", the lead-out patterns 511A, 511B, and 511C are collectively referred to merely as "lead-out pattern 511", and the lead-out patterns 611A, 611B, and 611C are collectively referred to merely as "lead-out pattern 611". The lead-out patterns 111, 211, 311, 411, 511, and 611 are different from one another in planar position.

As illustrated in FIG. 6B, the terminal electrodes E1, E2, E3, E4, E5, and E6 are positioned respectively on the extensions of the lead-out patterns 111, 211, 311, 411, 511, and 611. The terminal electrode E1 includes terminal electrodes E1A, E1B, and E1C which are the extensions of the lead-out patterns 111A, 111B, and 111C, respectively, the terminal electrode E2 includes terminal electrodes E2A, E2B, and E2C which are the extensions of the lead-out patterns 211A, 211B, and 211C, respectively, the terminal electrode E3 includes terminal electrodes E3A, E3B, and E3C which are the extensions of the lead-out patterns 311A, 311B, and 311C, respectively, the terminal electrode E4 includes terminal electrodes E4A, E4B, and E4C which are the extensions of the lead-out patterns 411A, 411B, and 411C, respectively, the terminal electrode E5 includes terminal electrodes E5A, E5B, and E5C which are the extensions of the lead-out patterns 511A, 511B, and 511C, respectively, and the terminal electrode E6 includes terminal electrodes E6A, E6B, and E6C which are the extensions of the lead-out patterns 611A, 611B, and 611C, respectively.

The terminal electrode E1 protrudes from the substrates 10, 20, and 30 and is thus provided so as not to overlap the substrates 10, 20, and 30, so that the three terminal electrodes E1A, E1B, and E1C of the terminal electrode E1 can easily be connected to one another. The same applies to the other terminal electrodes E2, E3, E4, E5, and E6. Although not particularly limited, the three terminal electrodes (e.g., E1A, E1B, and E1C) can be connected ultrasonically.

Figure 7:
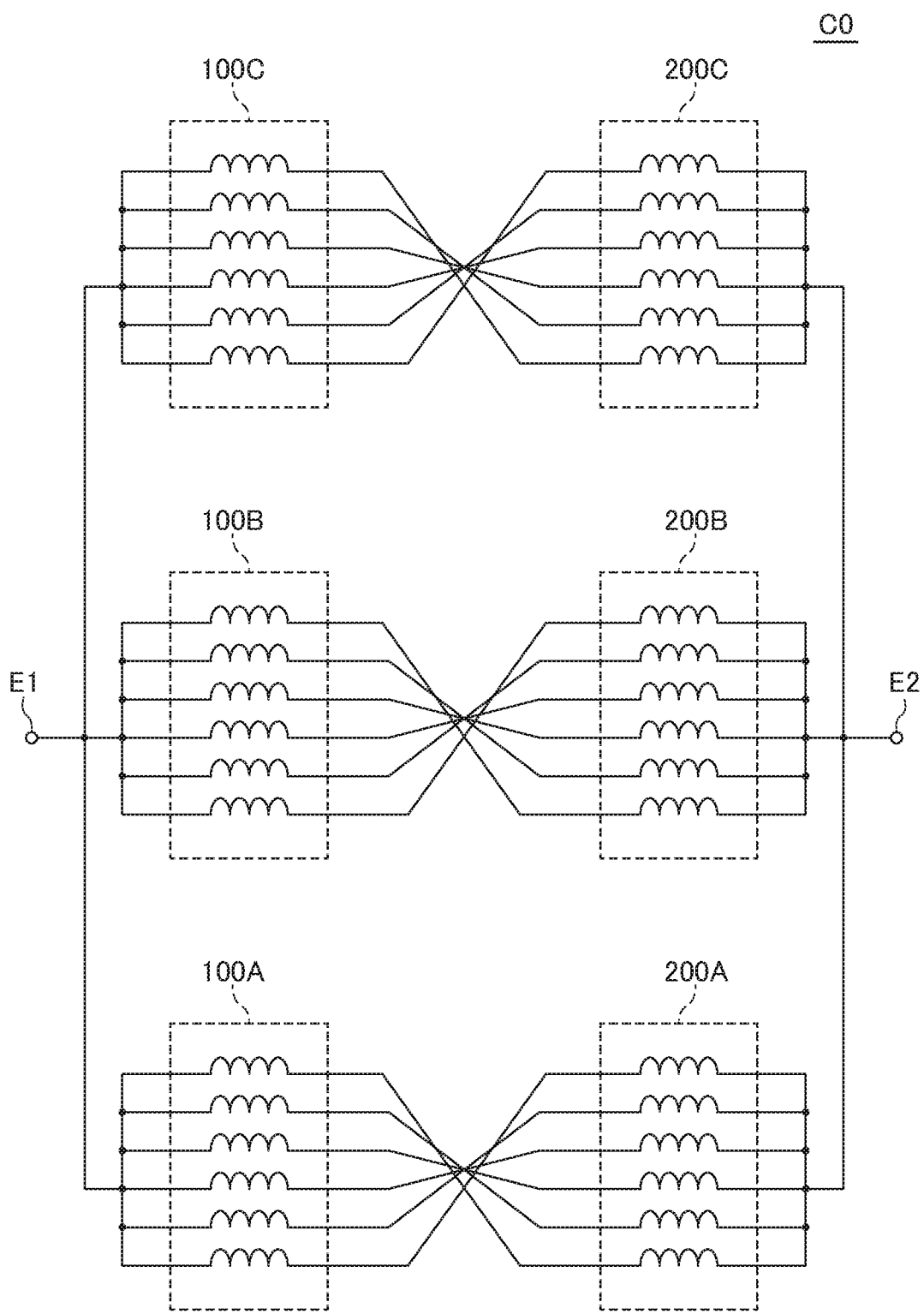
FIG. 7 is an equivalent circuit diagram of the center coil.

Thus, as illustrated in FIG. 7, a coil composed of the coil patterns 100A and 200A, a coil composed of the coil patterns 100B and 200B, and a coil composed of the coil patterns 100c and 200C are connected in parallel to constitute the center coil C0. Thus, the center coil C0 has a configuration in which three coils are connected in parallel, so that a current about three times that obtained when only one coil is used can be made to flow. However, in the present invention, the number of coils to be connected in parallel is not limited to this.

FIG. 8A is a schematic cross-sectional view of a portion where the lead-out pattern is formed according to a first modification, and FIG. 8B is a schematic cross-sectional view of a portion where the terminal electrode is formed according to the first modification.

In the first modification illustrated in FIGS. 8A and 8B, dummy patterns 111D and 211D are provided on the surfaces of the substrates 40, 50, and 60. The dummy pattern 111D is provided so as to overlap the lead-out pattern 111 in a plan view, and the dummy pattern 211D is provided so as to overlap the lead-out pattern 211 in a plan view. A dummy electrode D1 is provided on the extension of the dummy pattern 111D, and a dummy electrode D2 is provided on the extension of the dummy pattern 211D. The dummy electrodes D1 and D2 are provided so as not to overlap the substrates 10, 20, 30, 40, 50, and 60. The dummy electrodes D1 and D2 overlap the terminal electrodes E1 and E2, respectively, and connected thereto, respectively. The use of such dummy electrodes D1 and D2 allows the terminal electrodes E1, E2, E3, E4, E5, and E6 to be ultrasonically connected in a state where they are placed on a flat stage S as illustrated in FIG. 8B. That is, upon ultrasonic connection, no bending stress is applied to the terminal electrodes E1 and E2.

FIG. 9A is a schematic cross-sectional view of a portion where the lead-out pattern is formed according to a second modification, and FIG. 9B is a schematic cross-sectional view of a portion where the terminal electrode is formed according to the second modification.

In the second modification illustrated in FIGS. 9A and 9B, dummy patterns 311D, 411D, 511D, and 611D are provided on the surfaces of the substrates 10, 20, and 30. The dummy pattern 311D is provided so as to overlap the lead-out pattern 311 in a plan view, the dummy pattern 411D is provided so as to overlap the lead-out pattern 411 in a plan view, the dummy pattern 511D is provided so as to overlap the lead-out pattern 511 in a plan view, and the dummy pattern 611D is provided so as to overlap the lead-out pattern 611 in a plan view. A dummy electrode D3 is provided on the extension of the dummy pattern 311D, a dummy electrode D4 is provided on the extension of the dummy pattern 411D, a dummy electrode D5 is provided on the extension of the dummy pattern 511D, and a dummy electrode D6 is provided on the extension of the dummy pattern 611D. The dummy electrodes D3, D4, D5, and D6 are provided so as not to overlap the substrates 10, 20, 30, 40, 50, and 60. The dummy electrodes D3, D4, D5, and D6 overlap the terminal electrodes E3, E4, E5, and E6, respectively, and connected thereto, respectively. The use of such dummy electrodes D3, D4, D5, and D6 can not only prevent bending stress from being applied to the terminal electrodes E1 and E2 when the terminal electrodes E1, E2, E3, E4, E5, and E6 are ultrasonically connected in the state of being placed on a flat stage S as illustrated in FIG. 9B, but also make conditions in the ultrasonic connection of the terminal electrodes E1, E2, E3, E4, E5, and E6 coincide.

The following describes the planar shape of each coil pattern.

Figure 10:
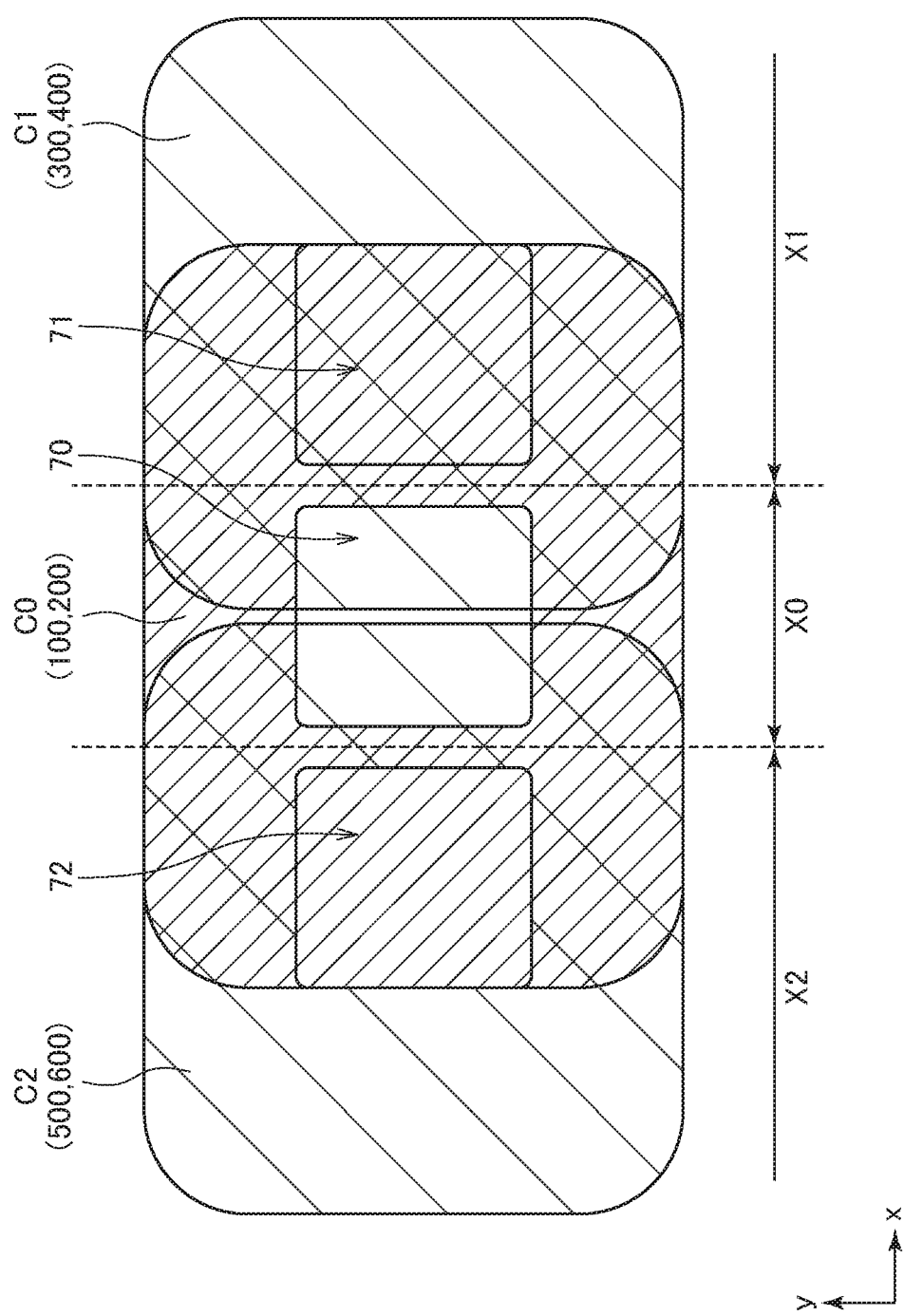
FIG. 10 is a schematic plan view transparently illustrating the coil component according to an embodiment of the present invention.

FIG. 10 is a schematic plan view transparently illustrating the coil component 1 according to the present embodiment.

In FIG. 10, the hatched areas are each a coil area including the entire coil pattern from its innermost turn to outermost turn, i.e., an area including the entire coil pattern excluding the inner diameter area of the coil pattern. The specific pattern shape within the coil area will be described later.

As illustrated in FIG. 10, a part of the coil area of the center coil C0 has an overlap with the coil area of the first side coil C1 in a plan view, and another part of the coil area of the center coil C0 has an overlap with the coil area of the second side coil C2 in a plan view. The coil area of the first side coil C1 and the coil area of the second side coil C2 do not have an overlap. The coil area of the first side coil C1 and the coil area of the second side coil C2 have shapes symmetric with respect to the center line of the center coil C0 in the x-direction and are disposed symmetrically with respect thereto. In the present embodiment, the coil areas of the respective center coil C0, first side coil C1, and second side coil C2 have the same width in the y-direction.

The center coil C0, first side coil C1, and second side coil C2 have their respective inner diameter areas 70 to 72. The inner diameter area refers to an area surrounded by the coil pattern, where there is no conductor pattern. As illustrated in FIG. 10, in the present embodiment, a part of the inner diameter area 70 of the center coil C0 overlaps the coil area of the first side coil C1, and another part of the inner diameter area 70 of the center coil C0 overlaps the coil area of the second side coil C2. Further, the inner diameter area 71 of the first side coil C1 completely overlaps the coil area of the center coil C0, and the inner diameter area 72 of the second side coil C2 completely overlaps the coil area of the center coil C0.

As described above, the three coils C0 to C2 constituting the coil component 1 according to the present embodiment are disposed such that the x-direction positions thereof differ from one another, so that when the coil component 1 is used as a power transmitting coil of a wireless power transmission system, a power feedable area is enlarged in the x-direction. For example, the following configuration is possible: the center coil C0 is used to perform power feeding when a power receiving coil exists in the area X0 of FIG. 2; the first side coil C1 is used to perform power feeding when a power receiving coil exists in the area X1; and the second side coil C2 is used to perform power feeding when a power receiving coil exists in the area X2. The boundary between the areas X0 and X1 may be set between the inner diameter areas 70 and 71, and the boundary between the areas X0 and X2 may be set between the inner diameter areas 70 and 72.

Figure 11:
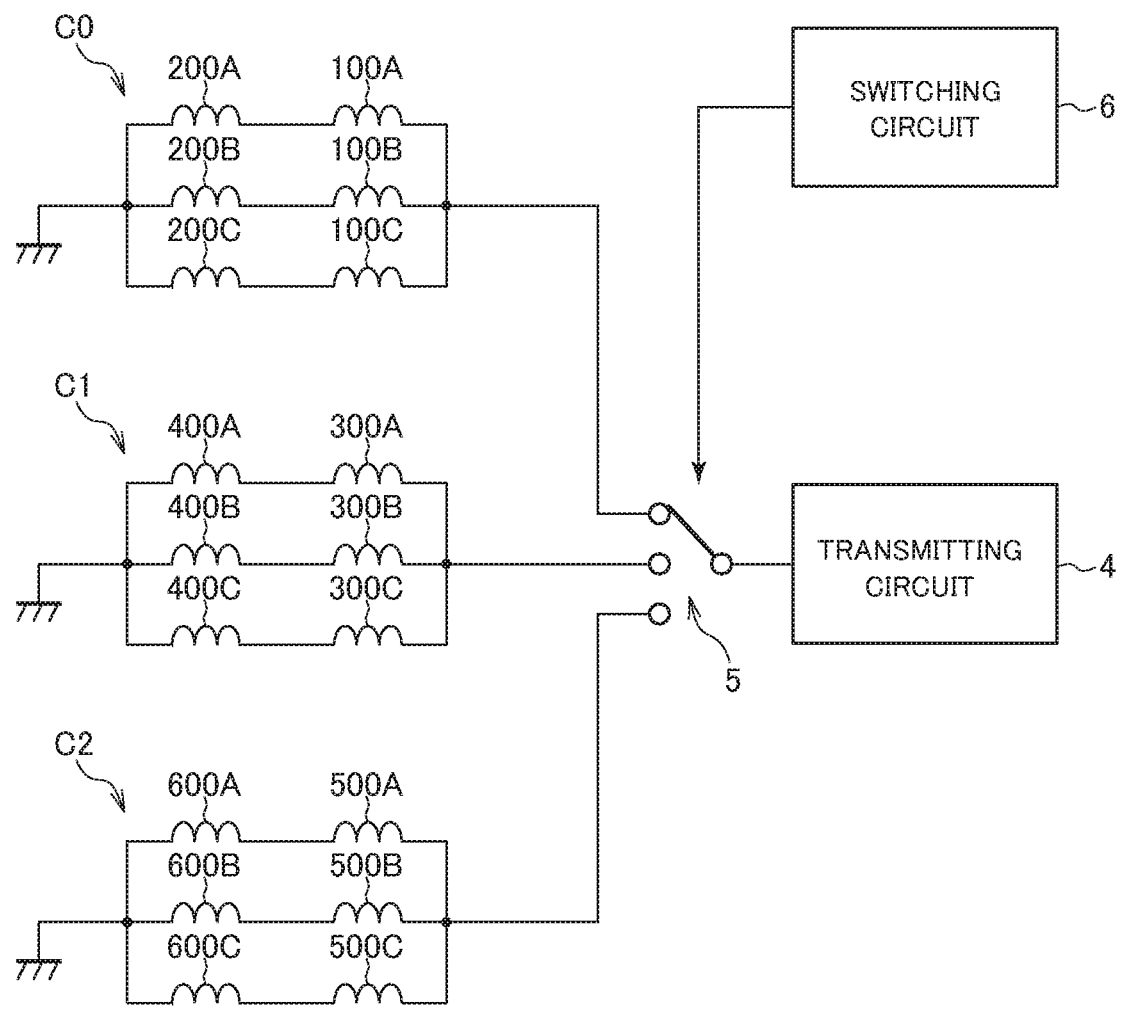
FIG. 11 is a circuit diagram of the coil component shown in FIG. 1 and a peripheral circuit connected to the coil component.

FIG. 11 is a circuit diagram of the coil component 1 and a peripheral circuit connected to the coil component 1.

As illustrated in FIG. 11, the center coil C0 has a configuration in which serially connected coil patterns 100A, 200A, serially connected coil patterns 100B, 200B, and serially connected coil patterns 100C, 200C are connected in parallel. Similarly, the first side coil C1 has a configuration in which serially connected coil patterns 300A, 400A, serially connected coil patterns 300B, 400B, and serially connected coil patterns 300C, 400C are connected in parallel. The second side coil C2 has a configuration in which serially connected coil patterns 500A, 600A, serially connected coil patterns 500B, 600B, and serially connected coil patterns 500C, 600C are connected in parallel.

When the coil component 1 according to the present embodiment is used as a power transmitting coil of a wireless power transmission system, one of the center coil C0, side coil C1, and side coil C2 is connected to a power transmitting circuit 4 through a switch 5. The switch 5 is a circuit exclusively connecting the power transmitting circuit 4 and one of the coils C0, C1, and C2, and the switching of connection is controlled by a switching circuit 6. Thus, current output from the power transmitting circuit 4 is supplied to one of the coils C0, C1, and C2. The power transmitting circuit 4, switch 5, and switching circuit 6 may be formed on a circuit board 700 described later.

Figure 12:
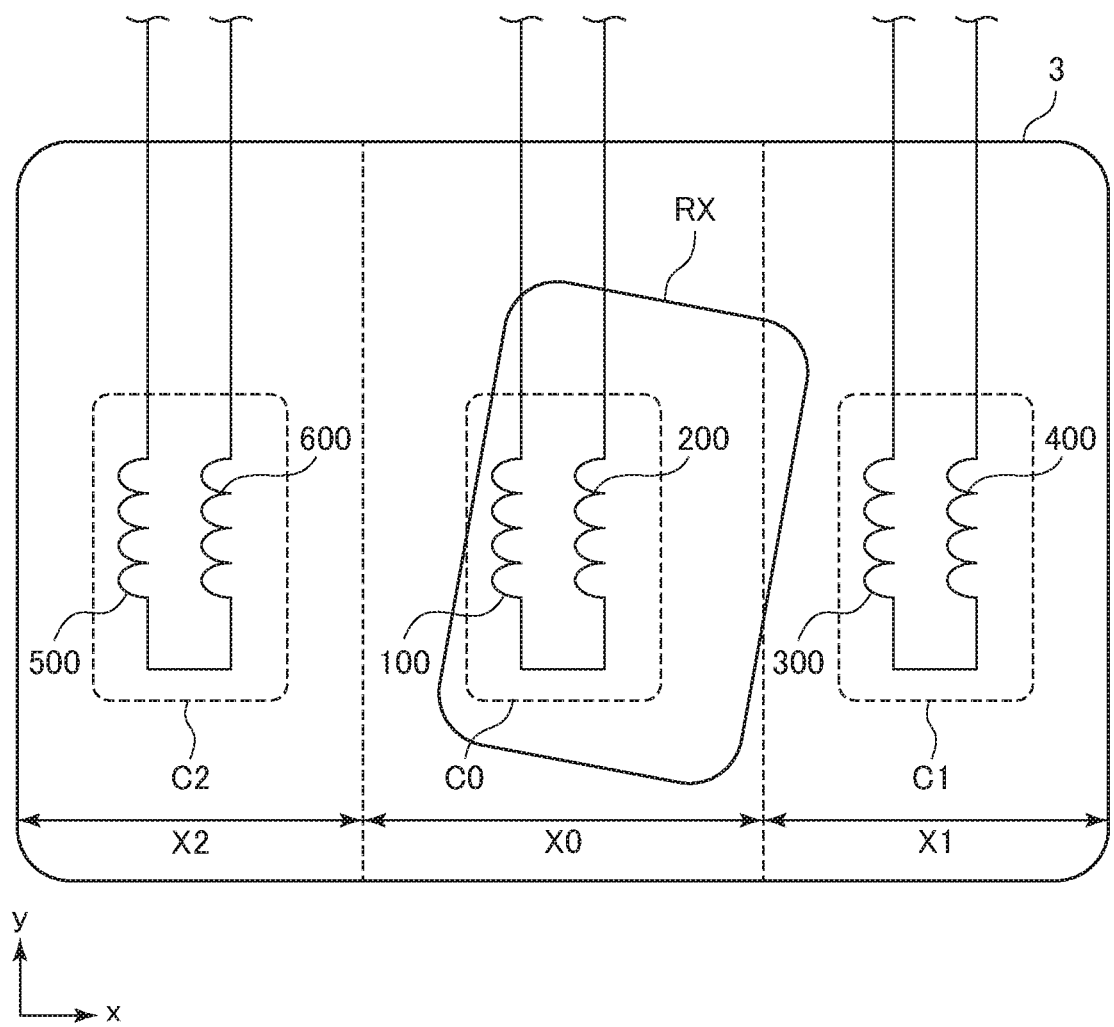
FIG. 12 is a schematic view illustrating the outer appearance of a wireless power transmitting device when the coil component shown in FIG. 1 is used as a transmitting coil of a wireless power transmission system.

FIG. 12 is a schematic view illustrating the outer appearance of a wireless power transmitting device when the coil component 1 according to the present embodiment is used as a transmitting coil of a wireless power transmission system.

In the example illustrated in FIG. 12, the power receiving surface 3 constitutes the xy plane, and a wireless power receiving device RX is placed on the power receiving surface 3. The wireless power receiving device RX is, for example, a mobile terminal such as a smartphone. The power receiving surface 3 and wireless power receiving device RX are not provided with a positioning mechanism for correctly positioning them, and the wireless power receiving device RX is placed on the power receiving surface 3 by a user without any particular care. Then, as illustrated in FIG. 12, when the wireless power receiving device RX placed on the power receiving surface 3 exists in the area X0, the switching circuit 6 illustrated in FIG. 11 selects the center coil C0. It follows that current flows from the power transmitting circuit 4 to center coil C0, whereby power can be transmitted to the wireless power receiving device RX in a wireless manner. On the other hand, when the wireless power receiving device RX placed on the power receiving surface 3 exists in the area X1, the switching circuit 6 selects the first side coil C1. Further, when the wireless power receiving device RX placed on the power receiving surface 3 exists in the area X2, the switching circuit 6 selects the second side coil C2. As a result, proper power transmission can be performed regardless of the position of the wireless power receiving device RX on the power receiving surface 3. The position of the wireless power receiving device RX may be determined directly by using a position sensor or the like or indirectly through detection of a change in impedance or in power waveform in the coil component 1.

Figure 13:
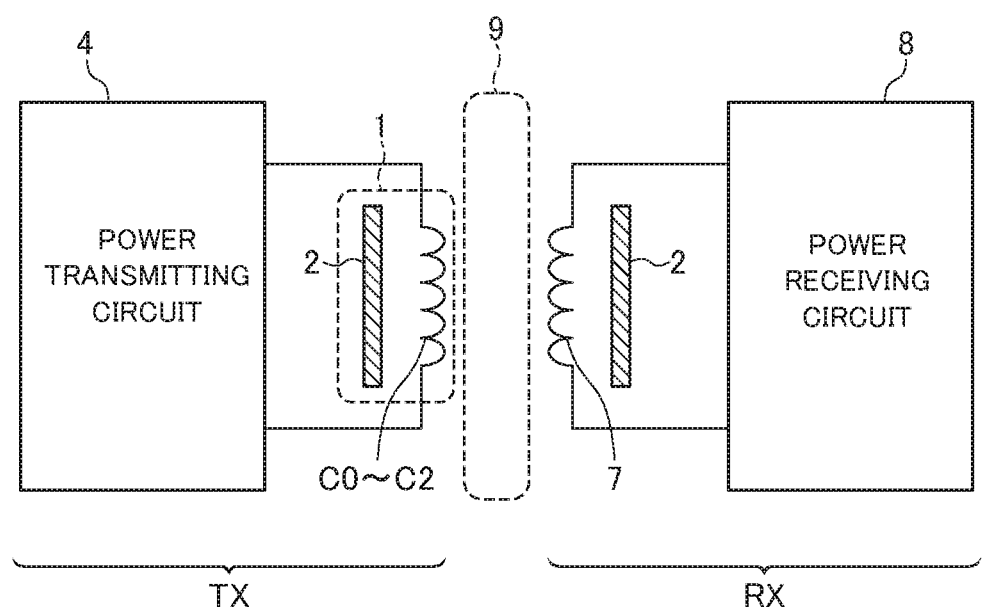
FIG. 13 is a schematic view illustrating the configuration of the wireless power transmission system using the coil component shown in FIG. 1.

FIG. 13 is a schematic view illustrating the configuration of the wireless power transmission system using the coil component 1 according to the present embodiment.

The wireless power transmission system illustrated in FIG. 13 is a system including a wireless power transmitting device TX and a wireless power receiving device RX, and power transmitting coils C0 to C2 included in the wireless power transmitting device TX and a power receiving coil 7 included in the wireless power receiving device RX are made to face each other through a space 9, whereby power transmission is performed by wireless. The power transmitting coils C0 to C2 are connected to the power transmitting circuit 4 including a power supply circuit, an inverter circuit, a resonant circuit, and the like to be supplied with AC current from the power transmitting circuit 4. The power receiving coil 7 is connected to a power receiving circuit 8 including a resonant circuit, a rectifying circuit, a smoothing circuit, and the like. When the power transmitting coils C0 to C2 and the power receiving coil 7 are made face each other so as to be magnetically coupled, power can be transmitted by wireless from the wireless power transmitting device TX to the wireless power receiving device RX through the space 9.

The magnetic sheets 2 are disposed, respectively, on the side opposite to the space 9 with respect to the power transmitting coils C0 to C2 and on the side opposite to the space 9 with respect to the power receiving coil 7. The magnetic sheet 2 plays a role of increasing the inductances of the power transmitting coils C0 to C2 and power receiving coil 7, thereby allowing achievement of more efficient power transmission.

The following describes a connection method between the coil component 1 and a circuit board through the terminal electrodes E1 to E6.

Figure 14:
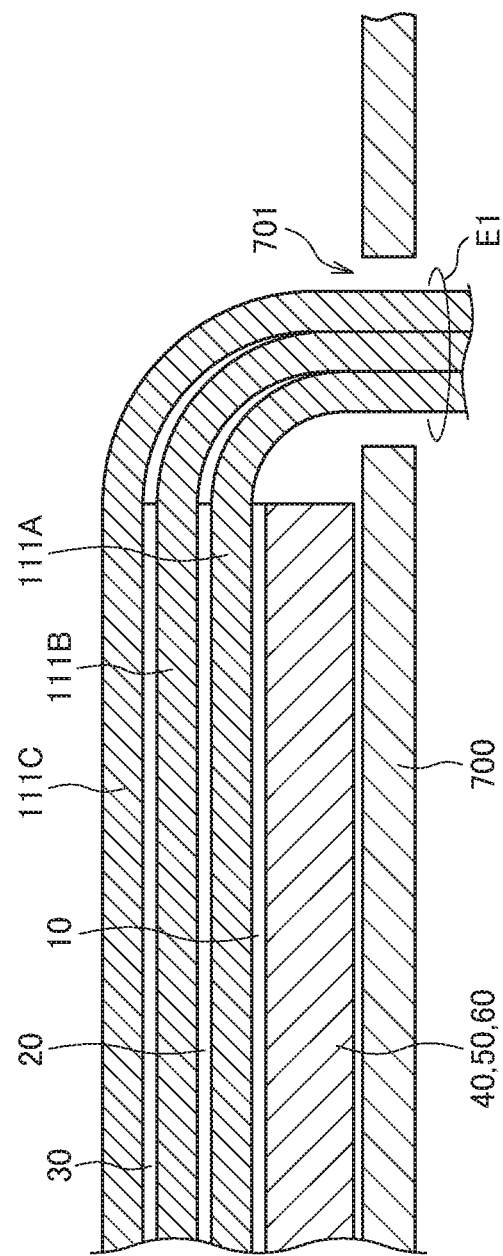
FIG. 14 is a schematic view for explaining a first method of connecting the coil component and a circuit board.

FIG. 14 is a schematic view for explaining a first method of connecting the coil component 1 and a circuit board 700.

In the first connection method, the coil component 1 is mounted on the surface of the circuit board 700 having a through hole 701, and the terminal electrodes E1 to E6 are bent at 90° and inserted into the through hole 701, whereby the coil component 1 and the circuit board 701 are connected. Thus, in the coil component 1 according to the present embodiment, the terminal electrodes E1 to E6 protrude from the substrates, so that connection between the coil component 1 and the circuit board 700 can be achieved by bending the terminal electrodes E1 to E6 and inserting them into the through hole 701. Alternatively, a connector may be mounted on the circuit board 700. This allows the terminal electrodes E1 to E6 to be connected to the circuit board 700 through the connector without being bent.

Figure 15:
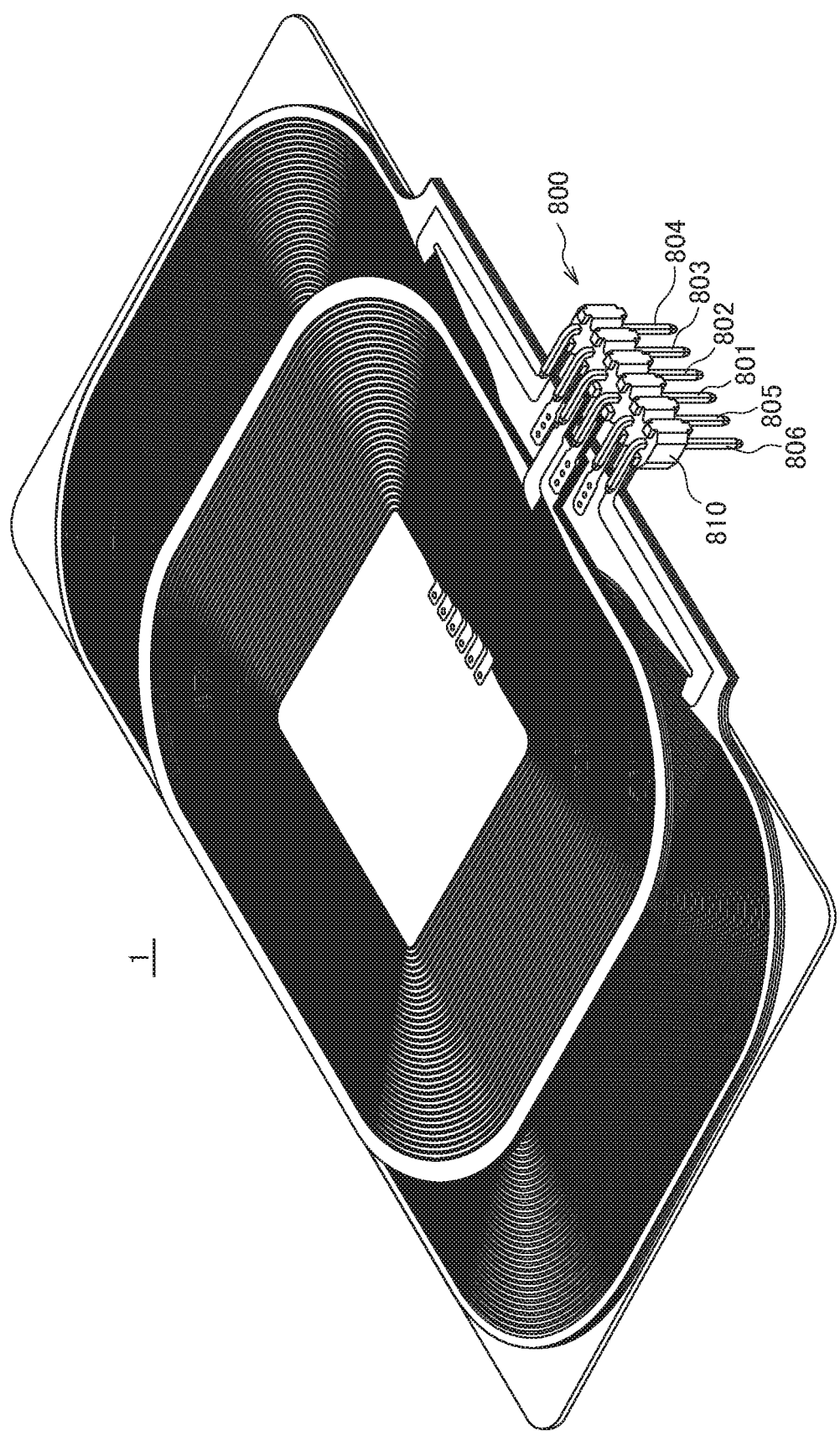
Figure 16:
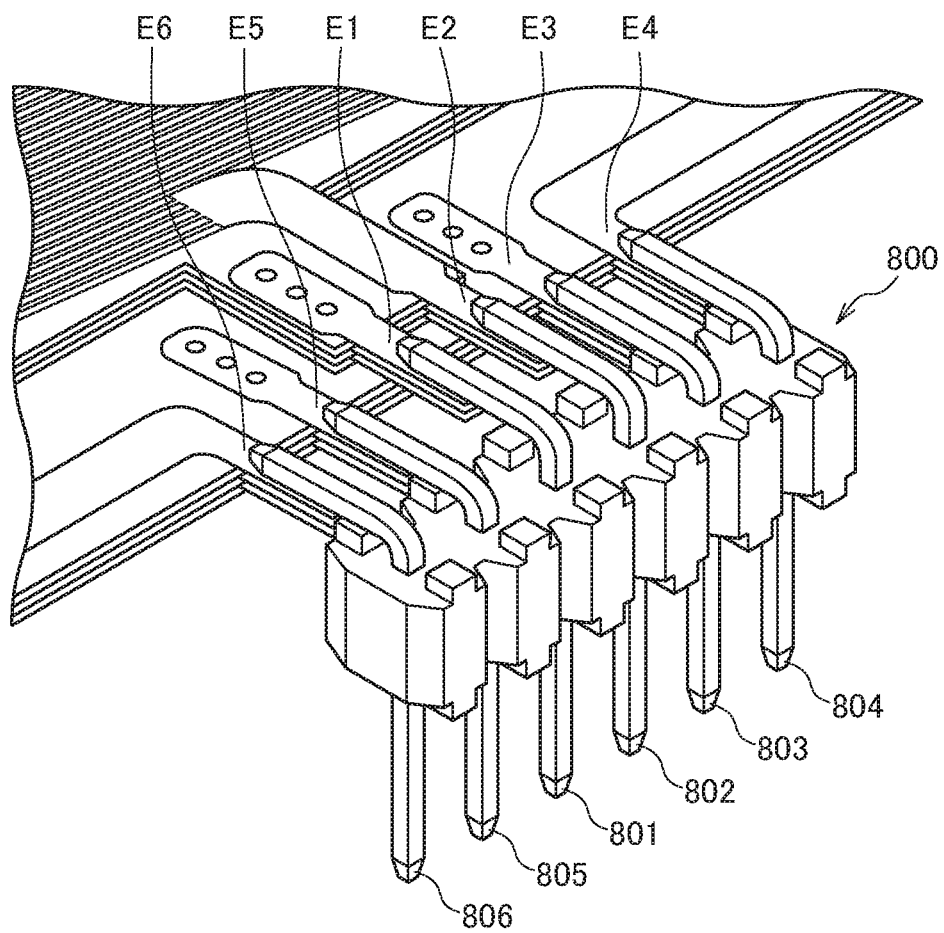

FIGS. 15 to 17 are schematic views for explaining a second method of connecting the coil component 1 and the circuit board 700.

In the second connection method, a connector member 800 illustrated in FIGS. 15 and 16 is used. The connector member 800 has six connector pins 801 to 806, which are connected to the terminal electrodes E1 to E6, respectively. The connector pins 801 to 806 each have a rod-shaped body made of metal such as copper and are bent at 90°. As illustrated in FIG. 16, the connector pins 801 to 806 are supported by a support 810 made of an insulating material such as resin such that they are arranged at equal intervals.

The connector pins 801 to 806 and the terminal electrodes E1 to E6 can be connected ultrasonically. As illustrated in FIG. 17, the coil component 1 is mounted on the circuit board 700 having a socket 702, and the connector pins 801 to 806 are inserted into the socket 702, whereby electrical connection between the coil component 1 and the circuit board 700 can be established. The coil component 1 may be fixed using, e.g., an adhesive.

As described above, by using the connector pins 801 to 806 connected respectively to the terminal electrodes E1 to E6, it is possible to facilitate connection between the coil component 1 and the circuit board 700.

It is apparent that the present invention is not limited to the above embodiments, but may be modified and changed without departing from the scope and spirit of the invention.

For example, although the coil component 1 according to the present embodiment includes one center coil C0 and two side coils C1 and C2, this is not essential in the present invention. Thus, the coil component 1 may include only the center coil C0, or may have only the side coil C1 or side coil C2. Further, the coil component 1 may include only one center coil C0 and one side coil C1, or may include only two side coils C1 and C2. Further, it is not essential that the side coils C1 and C2 do not overlap each other in a plan view, but they may partially overlap each other in a plan view.

Further, the number of the coil patterns constituting the center coil C0 or each of the side coils C1 and C2 and the number of turns of each coil pattern are also not particularly limited. Further, although two coil patterns (e.g., coil patterns 100A and 200A) are formed on the front and back surfaces of the insulating substrate in the above embodiment, this is also not essential in the present invention.

What is claimed is:

1. A coil component comprising:
first, second, third and fourth substrates;
a first coil pattern formed on one surface of the first substrate;
a second coil pattern formed on one surface of the second substrate;
a third coil pattern formed on an other surface of the first substrate;
a fourth coil pattern formed on an other surface of the second substrate;
a fifth coil pattern formed on one surface of the third substrate;
a sixth coil pattern formed on one surface of the fourth substrate;
a seventh coil pattern formed on an other surface of the third substrate;
an eighth coil pattern formed on an other surface of the fourth substrate;
a first terminal electrode connected to one end of the first coil pattern and protruding from the first substrate; and
a second terminal electrode connected to one end of the second coil pattern and protruding from the second substrate;
a third terminal electrode connected to one end of the third coil pattern and protruding from the first substrate;
a fourth terminal electrode connected to one end of the fourth coil pattern and protruding from the second substrate;
a fifth terminal electrode connected to one end of the fifth coil pattern and protruding from the third substrate;
a sixth terminal electrode connected to one end of the sixth coil pattern and protruding from the fourth substrate;

a seventh terminal electrode connected to one end of the seventh coil pattern and protruding from the third substrate;
an eighth terminal electrode connected to one end of the eighth coil pattern and protruding from the fourth substrate; and
first and second dummy electrodes protruding from the third substrate,
wherein an other end of the first coil pattern and an other end of the third coil pattern are connected to each other,
wherein an other end of the second coil pattern and an other end of the fourth coil pattern are connected to each other,
wherein an other end of the fifth coil pattern and an other end of the seventh coil pattern are connected to each other,
wherein an other end of the sixth coil pattern and an other end of the eighth coil pattern are connected to each other,
wherein the first and second substrates are laminated such that the first and second terminal electrodes overlap each other and are connected to each other and such that the third and fourth terminal electrodes overlap each other and are connected to each other,
wherein the third and fourth substrates are laminated such that the fifth and sixth terminal electrodes overlap each other and are connected to each other and such that the seventh and eighth terminal electrodes overlap each other and are connected to each other,
wherein the first, second, third, and fourth substrates are laminated such that the first to fourth coil patterns and the fifth to eighth coil patterns partly overlap,
wherein the first dummy electrode overlaps the first and second terminal electrodes, and
wherein the second dummy electrode overlaps the third and fourth terminal electrodes.

2. The coil component as claimed in claim 1, further comprising third and fourth dummy electrodes protruding from the fourth substrate,
wherein the third dummy electrode overlaps the first and second terminal electrodes and the first dummy electrode, and
wherein the fourth dummy electrode overlaps the third and fourth terminal electrodes and the second dummy electrode.

3. The coil component as claimed in claim 2, further comprising:
fifth and seventh dummy electrodes protruding from the first substrate; and
sixth and eighth dummy electrodes protruding from the second substrate,
wherein the fifth and sixth dummy electrodes overlap the fifth and sixth terminal electrodes, and
wherein the seventh and eighth dummy electrodes overlap the seventh and eighth terminal electrodes.

4. The coil component as claimed in claim 1, further comprising:
a first connector pin connected to the first and second terminal electrodes;
a second connector pin connected to the third and fourth terminal electrodes;
a third connector pin connected to the fifth and sixth terminal electrodes; and
a fourth connector pin connected to the seventh and eighth terminal electrodes.

5. A wireless power transmission device comprising:
a coil component; and
a circuit board,
wherein the coil component comprising:
first, second, third, and fourth substrates;
a first coil pattern formed on one surface of the first substrate;
a second coil pattern formed on one surface of the second substrate;
a third coil pattern formed on an other surface of the first substrate;
a fourth coil pattern formed on an other surface of the second substrate;
a fifth coil pattern formed on one surface of the third substrate;
a sixth coil pattern formed on one surface of the fourth substrate;
a seventh coil pattern formed on an other surface of the third substrate;
an eighth coil pattern formed on an other surface of the fourth substrate;
a first terminal electrode connected to one end of the first coil pattern and protruding from the first substrate;
a second terminal electrode connected to one end of the second coil pattern and protruding from the second substrate,
a third terminal electrode connected to one end of the third coil pattern and protruding from the first substrate;
a fourth terminal electrode connected to one end of the fourth coil pattern and protruding from the second substrate,
a fifth terminal electrode connected to one end of the fifth coil pattern and protruding from the third substrate;
a sixth terminal electrode connected to one end of the sixth coil pattern and protruding from the fourth substrate;
a seventh terminal electrode connected to one end of the seventh coil pattern and protruding from the third substrate;
an eighth terminal electrode connected to one end of the eighth coil pattern and protruding from the fourth substrate;
a first connector pin connected to the first and second terminal electrodes;
a second connector pin connected to the third and fourth terminal electrodes;
a third connector pin connected to the fifth and sixth terminal electrodes; and
a fourth connector pin connected to the seventh and eighth terminal electrodes,
wherein an other end of the first coil pattern and an other end of the third coil pattern are connected to each other,
wherein an other end of the second coil pattern and an other end of the fourth coil pattern are connected to each other, wherein an other end of the fifth coil pattern and an other end of the seventh coil pattern are connected to each other,
wherein other an end of the sixth coil pattern and an other end of the eighth coil pattern are connected to each other,
wherein the first and second substrates are laminated such that the first and second terminal electrodes overlap each other and are connected to each other and that the third and fourth terminal electrodes overlap each other and are connected to each other, wherein the third and fourth substrates are laminated such that the fifth and sixth terminal electrodes overlap each other and are connected to each other and that the seventh and eighth terminal electrodes overlap each other and are connected to each other, wherein the first, second, third, and fourth substrates are laminated such that the first to fourth coil patterns and the fifth to eighth coil patterns partly overlap, wherein the circuit board is connected to first to fourth coil patterns through the first and second connector pins, and wherein the circuit board is connected to fifth to eighth coil patterns through the third and fourth connector pins, and wherein the circuit board comprises a switch that exclusively makes current to flow in the first to fourth coil patterns and fifth to eighth coil patterns.

6. A coil component comprising:

a first substrate having first surface;

a second substrate having second surface;

a first coil pattern formed on the first surface of the first substrate;

a second coil pattern formed on the second surface of the second substrate;

a third coil pattern formed on a third surface of the first substrate that is opposite to the first surface;

a fourth coil pattern formed on a fourth surface of the second substrate that is opposite to the second surface;

a first conductive pattern connected to an outer peripheral end of the first coil pattern, the first conductive pattern including a first section formed on the first surface of the first substrate and a second section protruding from the first substrate; and a second conductive pattern connected to an outer peripheral end of the second coil pattern, the second conductive pattern including a third section formed on the second surface of the second substrate and a fourth section protruding from the second substrate, a third conductive pattern connected to an outer peripheral end of the third coil pattern, the third conductive pattern including a fifth section formed on the third surface of the first substrate and a sixth section protruding from the first substrate; and a fourth conductive pattern connected to an outer peripheral end of the fourth coil pattern, the fourth conductive pattern including a seventh section formed on the fourth surface of the second substrate and an eighth section protruding from the second substrate, wherein an inner peripheral end of the first coil pattern is connected to an inner peripheral end of the third coil pattern via a first through hole conductor penetrating the first substrate, wherein an inner peripheral end of the second coil pattern is connected to an inner peripheral end of the fourth coil pattern via a second through hole conductor penetrating the second substrate, wherein the second section of the first conductive pattern and the fourth section of the second conductive pattern are in contact with each other, and wherein the sixth section of the third conductive pattern and the eighth section of the fourth conductive pattern are in contact with each other.

7. The coil component as claimed in claim 6, further comprising a first connector pin having a horizontal section extending in substantially parallel with the first and second substrates and a vertical section extending in substantially perpendicular with the first and second substrates, wherein the horizontal section of the first connector pin overlaps the second section of the first conductive pattern and the fourth section of the second conductive pattern.

8. The coil component as claimed in claim 6, further comprising a second connector pin having a horizontal section extending in substantially parallel with the first and second substrates and a vertical section extending in substantially perpendicular with the first and second substrates, wherein the horizontal section of the second connector pin overlaps the sixth section of the third conductive pattern and the eighth section of the fourth conductive pattern.

9. The coil component as claimed in claim 8, further comprising a support member attached to the vertical sections of the first and second connector pins so as to keep a predetermined distance between the vertical sections of the first and second connector pins.

* * * * *